June 21, 1960 M. E. ROCHÉ Des.-Re. 24,841

HINGE FOR A PIVOTAL BEDFRAME

Original Filed Dec. 5, 1957 2 Sheets-Sheet 1

INVENTOR.
MELVIN E. ROCHÉ
BY Oldham & Oldham
ATTYS.

June 21, 1960 M. E. ROCHÉ Des.-Re. 24,841

HINGE FOR A PIVOTAL BEDFRAME

Original Filed Dec. 5, 1957 2 Sheets-Sheet 2

INVENTOR.
MELVIN E. ROCHÉ

BY Oldham & Oldham

ATTYS.

United States Patent Office

Des. Re. 24,841
Reissued June 21, 1960

24,841

HINGE FOR A PIVOTAL BEDFRAME

Melvin E. Roche, Berea, Ohio

Original No. 185,173, dated May 12, 1959, Ser. No. 48,782, Dec. 5, 1957, for 14 years. Application for reissue Dec. 17, 1959, Ser. No. 58,711. Term of patent 14 years

(Cl. D5—2)

Matter enclosed in heavy brackets [ ] appears in the original patent but forms no part of this reissue specification; matter printed in italics indicates the additions made by reissue.

Figure 1:
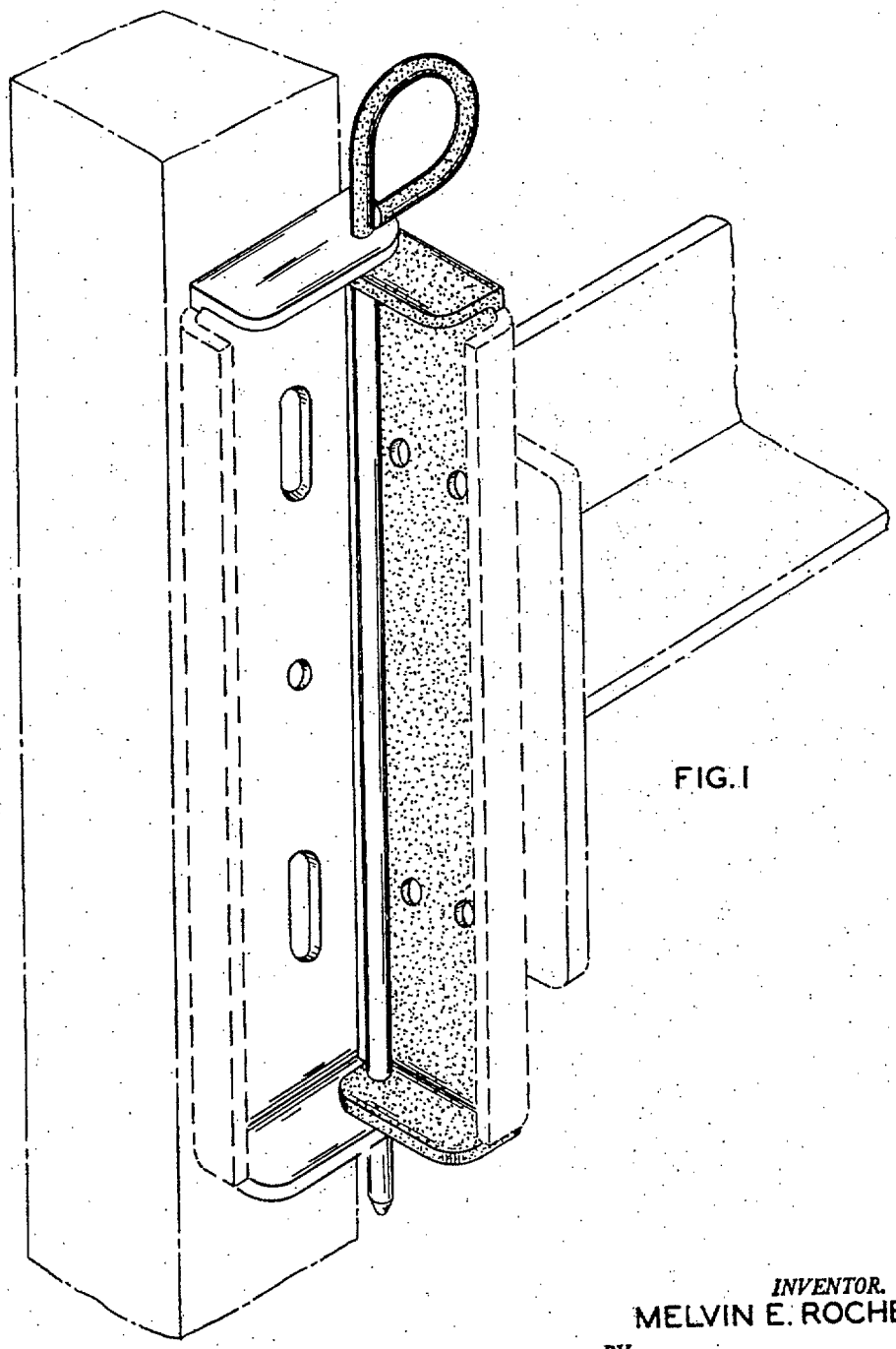

In Fig. 1 of the drawing, a novel hinge for a pivotal bedframe is shown in perspective. *The dominant feature of the hinge is shown in full lines.* An associated bed headboard leg and frame runner are shown in dot-dash lines with the novel hinge for illustrative purposes only.

Figure 2:
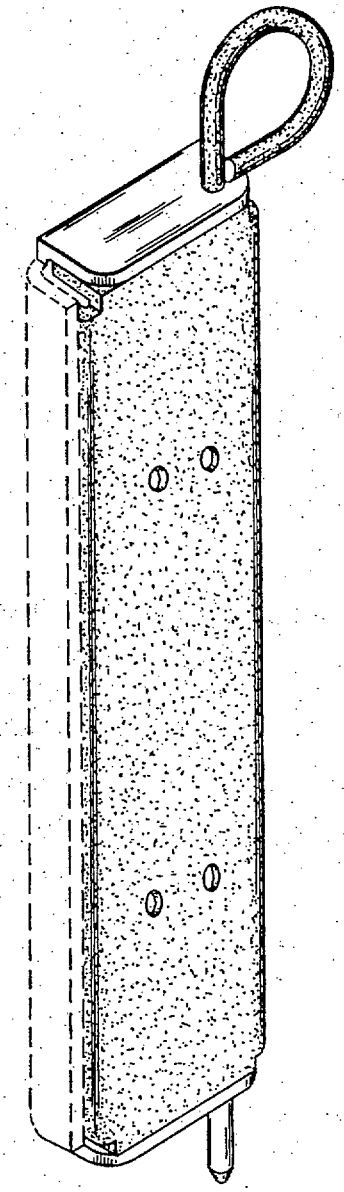

Fig. 2 shows the hinge of Fig. 1 in perspective and in a closed position.

Portions of the drawings are stippled to indicate contrast in surface materials.

I claim:

The ornamental design for a hinge for a pivotal bedframe, as shown and described.

References Cited in the file of this patent or the original patent

UNITED STATES PATENTS

| | | |
|---|---|---|
| 392,628 | Moran | Nov. 13, 1888 |
| 757,607 | Ferris | Apr. 19, 1904 |
| 1,955,909 | Favreau | Apr. 24, 1934 |
| 2,579,206 | Sands et al. | Dec. 18, 1951 |
| 2,686,322 | Blanke et al. | Aug. 17, 1954 |